United States Patent
Watanabe et al.

(10) Patent No.: US 11,383,338 B2
(45) Date of Patent: Jul. 12, 2022

(54) TOOL DRIVING DEVICE, TOOL FEEDING MECHANISM FOR TOOL ROTATING UNIT AND HOLE PROCESSING METHOD

(71) Applicant: SUBARU CORPORATION, Tokyo (JP)

(72) Inventors: Masao Watanabe, Tokyo (JP); Tatsuo Nakahata, Tokyo (JP); Ryohei Ono, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 183 days.

(21) Appl. No.: 16/733,364

(22) Filed: Jan. 3, 2020

(65) Prior Publication Data

US 2020/0298359 A1     Sep. 24, 2020

(30) Foreign Application Priority Data

Mar. 20, 2019   (JP) .............................. JP2019-53910

(51) Int. Cl.
| | |
|---|---|
| *B23Q 5/32* | (2006.01) |
| *B23B 39/10* | (2006.01) |
| *B23Q 5/26* | (2006.01) |
| *B23B 45/04* | (2006.01) |

(52) U.S. Cl.
CPC .............. *B23Q 5/326* (2013.01); *B23B 39/10* (2013.01); *B23B 45/04* (2013.01); *B23Q 5/266* (2013.01); *B23B 2260/07* (2013.01); *B23Q 2705/12* (2013.01)

(58) Field of Classification Search
CPC ......... B23B 39/10; B23B 45/04; B23Q 5/266; B23Q 5/263; B23Q 5/326; B23Q 2705/12
See application file for complete search history.

(56) References Cited

U.S. PATENT DOCUMENTS

| | | | | |
|---|---|---|---|---|
| 5,054,968 | A * | 10/1991 | Eckman ................. | B23Q 5/402 408/97 |
| 5,062,745 | A * | 11/1991 | Eckman ................. | B23Q 5/326 408/17 |
| 5,149,232 | A * | 9/1992 | Eckman ................. | B23Q 5/326 408/137 |
| 5,205,681 | A * | 4/1993 | Eckman ................. | B23Q 5/326 408/1 R |

(Continued)

FOREIGN PATENT DOCUMENTS

| | | |
|---|---|---|
| JP | 2010-228049 A | 10/2010 |
| JP | 2014-039992 A | 3/2014 |
| JP | 2015-501227 A | 1/2015 |

*Primary Examiner* — Alan Snyder
(74) *Attorney, Agent, or Firm* — Smith, Gambrell & Russell, LLP (57) ABSTRACT

According to one implementation, a tool feeding mechanism for a handheld tool rotating device, having a holder and a first air motor, includes a coupler, a fixing member, a moving mechanism and a second air motor. The holder chucks and holds a rotating tool. The first air motor rotates the holder. The tool feeding mechanism is attached to the tool rotating device. The coupler is attached to the tool rotating device. The fixing member is attached directly or indirectly to a workpiece of hole processing using the rotating tool. The moving mechanism moves the coupler relatively to the fixing member in a tool axis direction. The second air motor powers the moving mechanism.

22 Claims, 5 Drawing Sheets

(56) References Cited

U.S. PATENT DOCUMENTS

| | | | |
|---|---|---|---|
| 6,565,293 B2* | 5/2003 | Desmoulins | B23Q 5/263 408/10 |
| 2010/0247254 A1* | 9/2010 | Uchiuzo | B23Q 5/261 408/57 |
| 2014/0054053 A1 | 2/2014 | Saito et al. | |
| 2014/0290974 A1 | 10/2014 | Eriksson et al. | |
| 2017/0100807 A1* | 4/2017 | Merlini, III | B23Q 5/326 |

* cited by examiner

ND HOLE PROCESSING METHOD

CROSS REFERENCES TO RELATED APPLICATIONS

This application is based upon and claims the benefit of priority from Japanese Patent Application No. 2019-53910, filed on Mar. 20, 2019; the entire contents of which are incorporated herein by reference.

FIELD

Implementations described herein relate generally to a tool driving device, a tool feeding mechanism for a tool rotating unit and a hole processing method.

BACKGROUND

Conventionally, an air-type (pneumatic) drill driving device is known as one of drill driving devices (for example, refer to Japanese Patent Application Publication JP 2010-228049 A, Japanese Patent Application Publication JP 2014-039992 A and Japanese Patent Application Publication JP 2015-501227 A). Some air-type drill driving devices can not only rotate a drill but feed the drill in the tool axis direction by air pressure.

An object of the present invention is to allow hole processing, such as drilling of a workpiece and finishing an internal surface of a hole, under more preferable conditions using an air-type drill driving device.

SUMMARY OF THE INVENTION

In general, according to one implementation, a tool feeding mechanism for a handheld tool rotating device, having a holder and a first air motor, includes a coupler, a fixing member, a moving mechanism and a second air motor. The holder chucks and holds a rotating tool. The first air motor rotates the holder. The tool feeding mechanism is attached to the tool rotating device. The coupler is attached to the tool rotating device. The fixing member is attached directly or indirectly to a workpiece of hole processing using the rotating tool. The moving mechanism moves the coupler relatively to the fixing member in a tool axis direction. The second air motor powers the moving mechanism.

Further, according to one implementation, a tool driving device includes a holder, a first motor, and a feeding mechanism. The holder chucks and holds a rotating tool. The first air motor for rotates the holder. The feeding mechanism moves the holder in a tool axis direction. The feeding mechanism includes a second air motor that generates power for moving the holder.

Further, according to one implementation, a hole processing method including producing a product using the above-mentioned tool driving device.

DETAILED DESCRIPTION

A tool driving device, a tool feeding mechanism for a tool rotating unit and a method of processing a hole according to implementations of the present invention will be described with reference to the accompanying drawings.

Structure and Function

Figure 1:
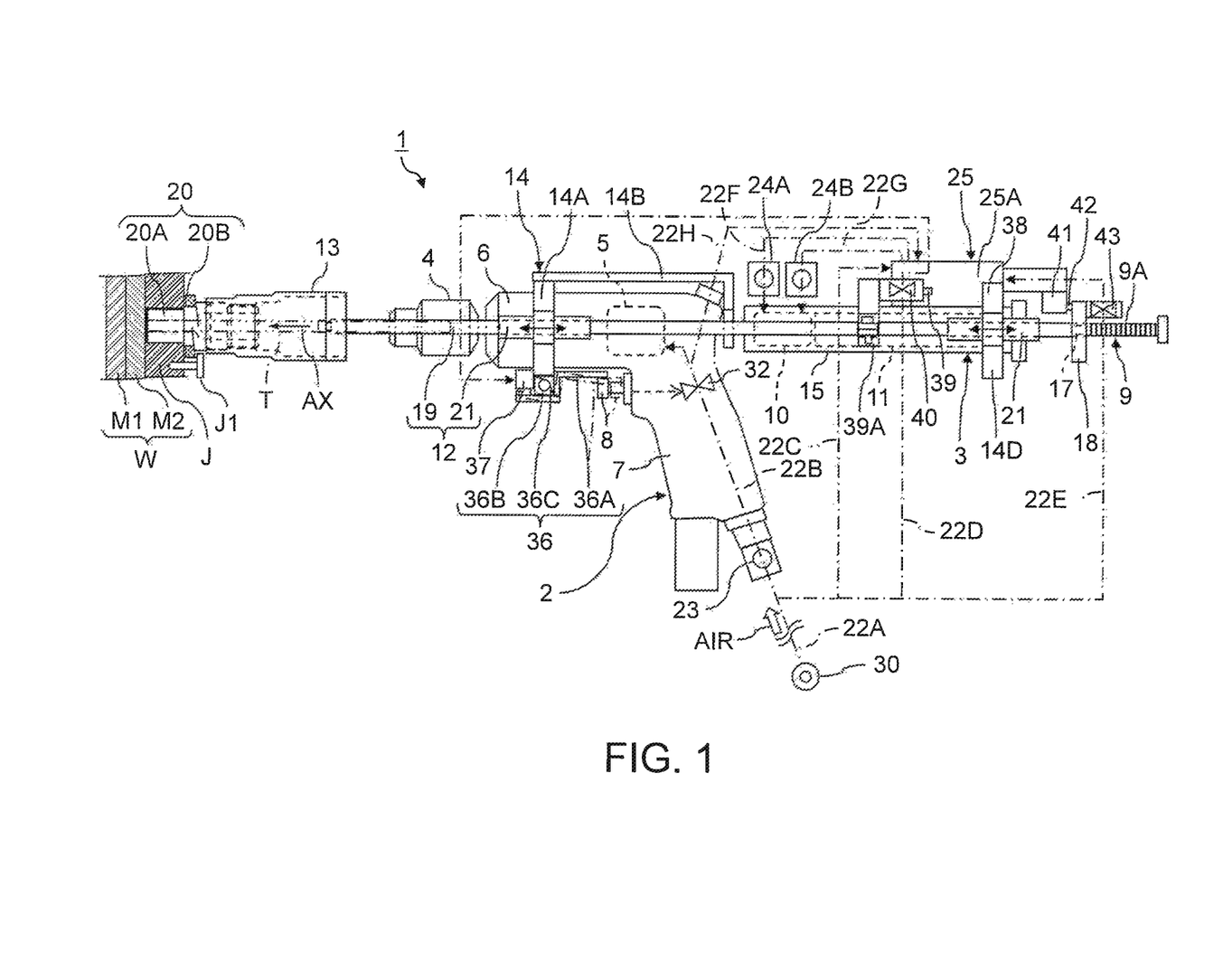
FIG. 1 is a front view showing structure of a tool driving device including a tool feeding mechanism according to an implementation of the present invention.
Figure 2:
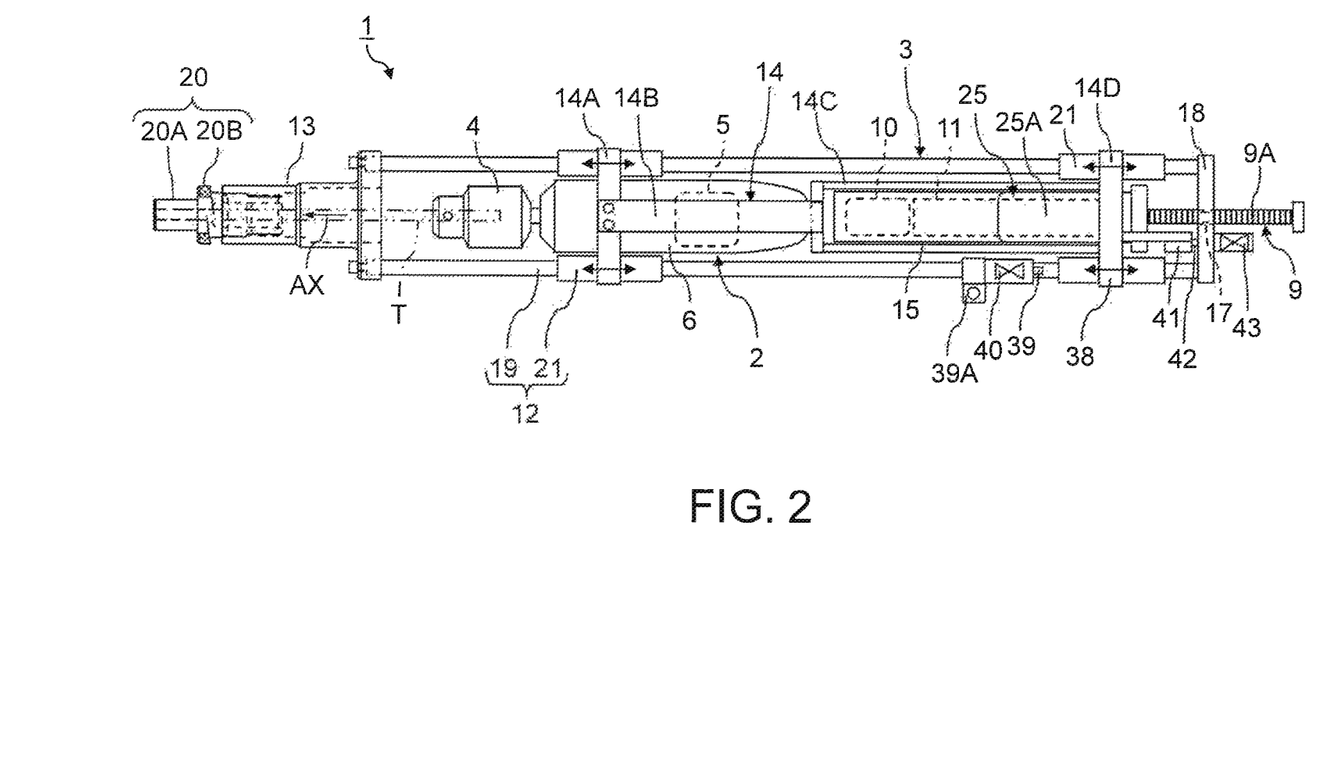
FIG. 2 is a top view of the tool driving device shown in FIG. 1.

FIG. 1 is a front view showing structure of a tool driving device including a tool feeding mechanism according to an implementation of the present invention, and FIG. 2 is a top view of the tool driving device shown in FIG. 1.

A tool driving device 1 is a hand tool for hole processing, such as drilling of a workpiece W and finishing of an inner surface of a hole, with attaching a rotating tool T, such as a drill bit, a reamer or an end mill. The tool driving device 1 has a function to perform not only rotation operation of the rotating tool T but feeding operation of the rotating tool T in the direction of the tool axis AX. Therefore, the tool driving device 1 includes a handheld tool rotating unit 2 to which a feeding mechanism 3 has been attached.

FIG. 1 and FIG. 2 shows an example in which the tool driving device 1 is produced by re-creation of attaching the feeding mechanism 3 as an attachment to the general-purpose tool rotating unit 2. When the tool driving device 1 is produced using the general-purpose tool rotating unit 2, production cost of the tool driving device 1 can be reduced remarkably. Moreover, the tool driving device 1 having a feeding operation function of the rotating tool T can be easily produced using the existing tool rotating unit 2. Accordingly, the feeding mechanism 3 may also be produced and distributed as a tool feeding mechanism used by being attached to the handheld tool rotating unit 2.

As a matter of course, the tool driving device 1 may be composed of the dedicated tool rotating unit 2, which does not operate independently, and the feeding mechanism 3. In that case, a casing of components composing the tool rotating unit 2 and all or a part of components composing the feeding mechanism 3 become common.

The tool rotating unit 2 can be composed of a holder 4, the first air motor 5, a housing 6, a grip 7 and a switch 8. The holder 4 is configured to rotate by power output from the first air motor 5, while chucking and holding the rotating tool T. The first air motor 5 rotates by an air signal, and the rotation speed of the first air motor 5 can be adjusted according to the flow rate of the air signal. The housing 6 houses the first air motor 5 and a known power transmission mechanism which transmits torque generated by the first air motor 5 to the holder 4. The grip 7 is a portion which a user holds by hand, and coupled to the housing 6. The switch 8 is mounted so, that a user can operate at least rotation of the first air motor 5.

The feeding mechanism 3 reciprocates the rotating tool T and the holder 4 in the tool axis AX direction relatively to the workpiece W. Specifically, the rotating tool T and the holder 4 positioned at an initial position can be fed toward the tip direction of the rotating tool T by the feeding mechanism 3 for hole processing of the workpiece W while the rotating tool T and the holder 4 positioned at a hole processing position can be stopped and retracted to a retracted position after the hole processing has been completed.

In particular, the feeding mechanism 3 has not only a linear movement mechanism 9 which linearly moves the holder 4 in the tool axis AX direction, but the second air motor 10 which generates the power for moving the holder 4 in parallel. That is, the feeding mechanism 3 has the second air motor 10 which powers the linear movement mechanism 9, separately to the first air motor 5 which generates the power for rotating the rotating tool T and the holder 4. The rotation speed of the second air motor 10 can be adjusted according to the flow rate of an air signal, similarly to the first air motor 5.

In addition, the feeding mechanism 3 can be composed of gears 11, a guide mechanism 12, a nosepiece 13, couplers 14 and the like.

The linear movement mechanism 9 is a machine element which converts rotational movement of the output shaft of the second air motor 10 into a liner movement so that the rotating tool T and the holder 4 may be linearly moved in the tool axis AX direction. The linear movement mechanism 9 is configured to move the rotating tool T and the holder 4 forward in the tool axis AX direction and the hole processing direction when the second air motor 10 is normally rotated. Meanwhile, the linear movement mechanism 9 is configured to move the rotating tool T and the holder 4 backward in the opposed direction to the hole processing direction when the second air motor 10 is reversely rotated.

Although a rack-and-pinion or a crawler, such as a chain moving by rotation of sprockets or a power transmission belt moving by rotation of rollers, may be used as the linear movement mechanism 9, using a ball screw 9A as exemplified in FIG. 1 and FIG. 2 makes it possible to dispose the output shaft of the second air motor 10 and the rotation axis of the ball screw 9A on the same straight line as the tool axis AX. As a result, the configuration of the feeding mechanism 3 can be simplified. Thus, henceforth, an example of a case where the linear movement mechanism 9 is the ball screw 9A will be described with reference to FIG. 1 and FIG. 2.

When the holder 4 is moved in the tool axis AX direction by the ball screw 9A, disposing the ball screw 9A so that the rotation axis direction and the length direction of the ball screw 9A may be in the tool axis AX direction leads to simplification in the configuration and the effective use of a force generated by the ball screw 9A. Then, the ball screw 9A is rotated by the rotation power output from the second air motor 10. Specifically, one end of the ball screw 9A is coupled to the output shaft of the second air motor 10, and torque is given as the rotation power from the second air motor 10 to the ball screw 9A.

In general, torque which can be output from an air motor is smaller than torque which can be output from an electric motor. For this reason, it has been the conventional technical common sense that it is often difficult for the second air motor 10 to output the sufficient torque which should be given to the ball screw 9A in order to feed out the rotating tool T and the holder 4 while counteracting the cutting resistance at the time of hole processing. On the contrary, when the ball screw 9A is rotated by directly coupling the output shaft of the second air motor 10 with the ball screw 9A, hole processing can be performed only under hole processing conditions, in which the cutting resistance is small, according to the output torque of the second air motor 10.

Thus, it is practical to place the gears 11, which increase the torque output from the second air motor 10 and transmit the increased torque to the linear movement mechanisms 9, such as the ball screw 9A, in the feeding mechanism 3 as exemplified in FIG. 1 and FIG. 2. That is, the gears 11 can be coupled to the output shaft of the second air motor 10 so that the rotation speed of the output shaft of the second air motor 10 is decreased while torque can be increased. In the example shown in FIG. 1 and FIG. 2, the second air motor 10 and the gears 11 have been placed in a common housing 15.

Figure 3:
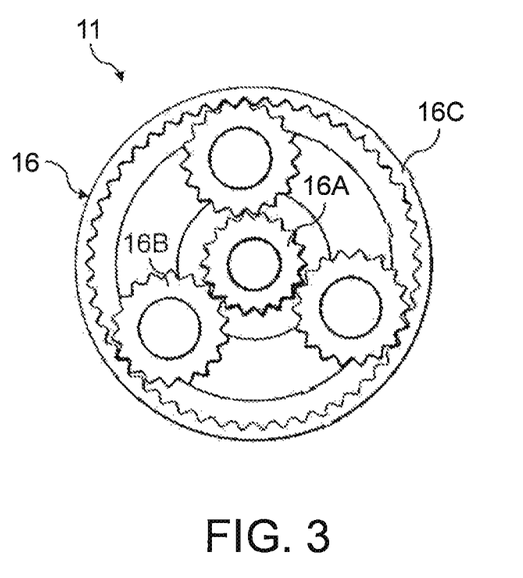
FIG. 3 shows an example of structure of a planetary gear used as the gears shown in FIG. 1 and FIG. 2.

FIG. 3 shows an example of structure of a planetary gear 16 used as the gears 11 shown in FIG. 1 and FIG. 2.

When the output shaft of the second air motor 10 and the rotation axis of the ball screw 9A are made coaxial, the planetary gear 16 exemplified in FIG. 3 can be used as the gears 11 which slow down the rotation speed of the second air motor 10. The planetary gear 16 is composed of a sun gear 16A consisting of a disk-shaped or cylindrical external gear, at least one planetary pinion 16B each consisting of a disk-shaped or cylindrical external gear, and a ring-shaped or cylindrical internal gear 16C. The planetary pinion 16B or the planetary pinions 16B rotate along the circumference of the sun gear 16A while the internal gear 16C rotate outside the planetary pinion 16B or the planetary pinions 16B.

Since the input shaft of the planetary gear 16 is fixed to the sun gear 16A, the output shaft of the second air motor 10 is fixed to the sun gear 16A of the planetary gear 16. Meanwhile, the output shaft of the planetary gear 16 is fixed to the internal gear 16C or a planetary career rotatably coupled to the rotation shafts of the planetary pinions 16B. The ball screw 9A is fixed to the output shaft of the planetary gear 16.

When a plurality of the planetary gears 16 are coupled in series, the torque output from the output shaft of the second air motor 10 can be made larger. Practically, two-stage or three-stage planetary gears 16 can be coupled to the output shaft of the second air motor 10.

When the ball screw 9A is coupled to the second air motor 10 through the gears 11, as needed, as described above, the second air motor 10 can be moved in parallel in the tool axis AX direction, which is the length direction of the ball screw 9A, relatively to a member 18 having a female screw 17 for fastening the ball screw 9A. Therefore, when the housing 15 in which the second air motor 10 is placed and fixed inside is fixed, with the couplers 14, to the tool rotating unit 2 including at least the holder 4, the first air motor 5, the housing 6, the grip 7 and the switch 8, the tool rotating unit 2 can be moved in the tool axis AX direction, relatively to the member 18 having the female screw 17, together with the housing 15 inside which the second air motor 10 is placed.

Note that, the member 18 having the female screw 17 for fastening the ball screw 9A may be fixed to the tool rotating unit 2 so that the second air motor 10 and the housing 15 placing the second air motor 10 may not move together with the tool rotating unit 2. That is, the tool rotating unit 2 may be reciprocated in the tool axis AX direction by the ball screw 9A without moving the second air motor 10 and the housing 15 placing the second air motor 10 in the tool axis AX direction.

Nevertheless, when the ball screw 9A is placed between the second air motor 10 and the tool rotating unit 2, it is necessary to position the rotation axis of the ball screw 9A in parallel to the tool axis AX with displacing the rotation axis of the ball screw 9A from the tool axis AX. Alternatively, a space having the length which covers a stroke in the feeding direction of the rotating tool T have to be formed between the end part of the ball screw 9A and the tool rotating unit 2. Accordingly, the length of the feeding mechanism 3 becomes long in order to secure a stroke, which may cause inconvenience in carriage and interference.

On the other hand, when the end part of the ball screw 9A in the tip side of the rotating tool T is directly coupled to the second air motor 10, or indirectly coupled to the second air motor 10 through the gears 11 so that the second air motor 10 is moved together with the holder 4 in the tool axis AX direction, the rotating axis of the ball screw 9A can be disposed on the same straight line as the tool axis AX of the rotating tool T so that a force on the same straight line as the tool axis AX can be applied from the end part of the ball screw 9A to the tool rotating unit 2.

As a result, generation of unnecessary torque due to a reason that the rotating axis of the ball screw 9A and the tool axis AX are not on the same straight line can be avoided, and the power of the second air motor 10 can be effectively used as energy for hole processing, such as drilling. In addition, force in the feeding direction from the ball screw 9A can be applied in the opposite direction to reaction force arising in the rotating tool T.

When the ball screw 9A is disposed so that the rotating axis of the ball screw 9A and the tool axis AX may be on the same straight line, the length of the feeding mechanism 3 becomes long according to the length of a stroke in the feeding direction of the rotating tool T and the holder 4. Accordingly, in order to shorten the length of the tool driving device 1 including the feeding mechanism 3, the feeding mechanism 3 including the ball screw 9A and the second air motor 10 may be disposed so that the rotating axis of the ball screw 9A may be parallel to the tool axis AX.

Figure 4:
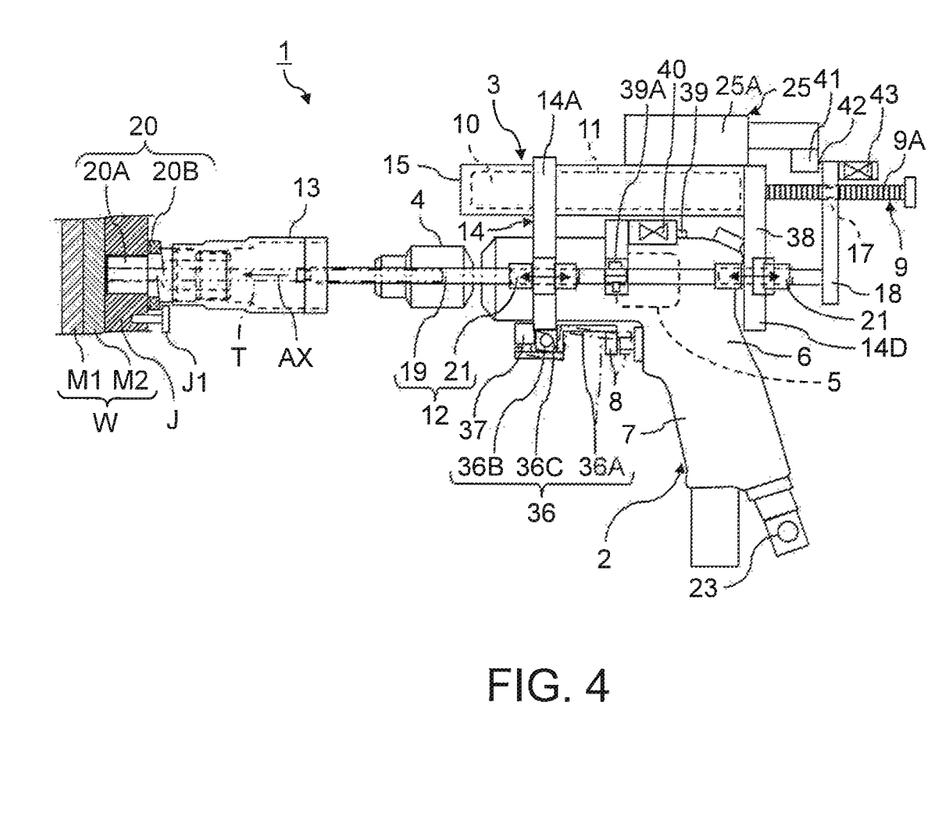
FIG. 4 shows an example of disposing the second air motor, the gear, and the ball screw shown in FIG. 1 and FIG. 2 so that each of their rotation axes may become parallel to the tool axis.

FIG. 4 shows an example of disposing the second air motor 10, the gear 11, and the ball screw 9A shown in FIG. 1 and FIG. 2 so that each of their rotation axes may become parallel to the tool axis AX. Note that, paths of air signals have been omitted in FIG. 4.

As exemplified in FIG. 4, the second air motor 10, the gears 11 and the ball screw 9A may be disposed so that each of their rotation axes may become parallel to the tool axis AX, i.e., parallel to the rotating axis of the rotating tool T, the holder 4 and the first air motor 5. In this case, the length of the tool driving device 1 including the feeding mechanism 3 can be shortened although torque is generated due to a reason that the rotating axis of the ball screw 9A and the tool axis AX are not on the same straight line. Thereby, it becomes possible to carry and use the tool driving device 1 in a narrower working area.

Similarly, also when the tool rotating unit 2 is a corner drill, the tool driving device 1 can be configured by attaching the feeding mechanism 3 to the corner drill. In case of a corner drill, the tool axis AX and the rotating shaft of the first air motor 5 which rotates the rotating tool T are not on the same straight line. Moreover, it is important to configure the tool driving device 1 so that interference with the workpiece W may not arise since a purpose of a corner drill is hole processing of a narrow portion.

Accordingly, the tool driving device 1 can be configured by disposing the second air motor 10, the gears 11 and the ball screw 9A at appropriate positions relatively to the tool rotating unit 2 so that the rotating tool T and the holder 4 can be moved in the tool axis AX direction without interference with the workpiece W.

A typical corner drill has the rotating shaft of the first air motor 5, for rotating the rotating tool T, which is perpendicular to the tool axis AX, i.e., perpendicular to the rotating axis of the rotating tool T and the holder 4. In this case, when the rotating axis of the second air motor 10, the gears 11 and the ball screw 9A is made parallel to the rotating axis of the rotating tool and the holder 4, the rotating axis of the second air motor 10, the gears 11 and the ball screw 9A becomes perpendicular to the rotating axis of the first air motor 5.

As exemplified in FIG. 1, FIG. 2 and FIG. 4, at least two shafts 19 are fixed to the member 18, having the female screw 17 which relatively moves the ball screw 9A in the length direction, so that each length direction of the shafts 19 may be parallel to the tool axis AX direction. Meanwhile, the nosepiece 13 is fixed to the other end parts of the shafts 19.

The nosepiece 13 is a nozzle-shaped casing attached to the tip of the tool driving device 1, and functions as a fixing member attached directly or indirectly to the workpiece W which is a target of hole processing by the rotating tool T. A bushing chip 20 is attached to the typical nosepiece 13. The bushing chip 20 may be integrated with the tip of the nosepiece 13. The nosepiece 13 and the bushing chip 20 function as fixing members for fixing the tool driving device 1 to the workpiece W or a jig J for hole processing, such as a perforation plate, attached to the workpiece W.

The bushing chip 20 has structure having a bush 20A and a plate-like part 20B, of which thickness is not constant, attached to the bush 20A. Meanwhile, a setscrew J1 can be fastened with a clearance equivalent to the thickness of the plate-like part 20B of the bushing chip 20, near a prepared hole formed in the workpiece W or a hole formed in the jig J, such as a perforation plate, which slidably fits to the bush 20A of the bushing chip 20. Thereby, the plate-like part 20B of the bushing chip 20 can be sandwiched and fixed by the setscrew J1 by inserting the bush 20A of the bushing chip 20 into the hole formed in the jig J or the prepared hole formed in the workpiece W, and subsequently rotating the bushing chip 20.

In such a manner, the tool driving device 1 including the nosepiece 13 can be fixed to the workpiece W and the jig J, in an appropriate direction, using the bushing chip 20. Specifically, the tool driving device 1 can be fixed to the workpiece W and the jig J with positioning the tool driving device 1 to the workpiece W and the jig J so that the tool axis AX direction may be the depth direction of a hole to be drilled. Therefore, the linear movement mechanism 9, such as the ball screw 9A, is configured as a device which moves the tool rotating unit 2 including the holder 4, in the tool axis AX direction, relatively to the nosepiece 13 and the bushing chip 20 which function as members for fixing the tool driving device 1 to the workpiece W or the jig 3.

The processing reaction force, such as drilling reaction force, arising due to hole processing of the workpiece W with the rotating tool T is received by the bushing chip 20 and the nosepiece 13. The processing reaction force received by the nosepiece 13 is transmitted to the member 18, having the female screw 17, through the shafts 19. Therefore, it is desirable to place the shafts 19, disposed in parallel to the tool axis AX direction, at the same interval so that the shafts 19 may be symmetric with regard to the tool axis AX as the center, from a viewpoint of preventing the generation of unnecessary torque by dispersing processing reaction force equally.

The shafts 19 are also used as guides for moving the tool rotating unit 2 in parallel in the tool axis AX direction. Specifically, linear bushes 21, which linearly slide in the tool axis AX direction using the shafts 19 as guides respectively, are fixed to the tool rotating unit 2 by an annular coupler 14A. As a result, the guide mechanism 12 for moving the tool rotating unit 2 in parallel in the tool axis AX direction is formed by the shafts 19 and the linear bushes 21 for linearly sliding the shafts 19 respectively. In the illustrated example, the linear bushes 21 have been also fixed to the housing 15 in which the second air motor 10 and the gears 11 are placed since the second air motor 10 and the gears 11 are configured to move in parallel in the tool axis AX direction together with the tool rotating unit 2.

Accordingly, the housing 15 in which the second air motor 10 and the gears 11 are placed can be moved in parallel in the tool axis AX direction, together with the tool rotating unit 2, by the linear bushes 21 which slide along the shafts 19. Thereby, even when component force perpendicular to the tool axis AX direction is generated in the tool rotating unit 2 due to the processing reaction force applied on the rotating tool T, in hole processing performed by the force in the tool axis AX direction applied from the ball screw 9A, positional displacement of the rotating tool T and the tool rotating unit 2 in a direction perpendicular to the tool axis AX direction can be prevented by the linear bushes 21 which can slide only in the tool axis AX direction relatively to the shafts 19.

In the illustrated example, relative positions of the two shafts 19 and the tool axis AX have been determined so that the center lines of the two shafts 19 and the tool axis AX may be parallel to each other on the same plane. Accordingly, generation of unnecessary frictional force between the shafts 19 and the linear bushes 21 caused by accuracy errors of the shafts 19 and the linear bushes 21 can be reduced, in addition to simplification in structure of the feeding mechanism 3 by minimization of the number of parts.

The couplers 14 are parts, such as a bracket, for attaching the feeding mechanism 3 to the tool rotating unit 2. Accordingly, the couplers 14 are attached to the tool rotating unit 2. Therefore, the linear movement mechanism 9, such as the ball screw 9A, composing the feeding mechanism 3, is configured to move the tool rotating unit 2, in the tool axis AX direction, together with the couplers 14, relatively to the nosepiece 13 and the bushing chip 20 which fix the tool driving device to the workpiece W and the jig J.

In the example shown in FIG. 1 and FIG. 2, the feeding mechanism 3 has been attached to the tool rotating unit 2 by the couplers 14 including the annular coupler 14A, an L-shaped coupler 14B, coupling shafts 14C and a coupling plate 14D. Specifically, the annular coupler 14A, for holding the housing 6 of the tool rotating unit 2 and fixing the linear bushes 21, and a back end part of the housing 6 are coupled to the two coupling shafts 14C through the L-shaped coupler 14B. The two coupling shafts 14C are disposed so that each of the length directions may be parallel to the tool axis AX and the coupling shafts 14C may be symmetric with regard to the tool axis AX as the center, similarly to the shafts 19 for guiding the linear bushes 21. The other end parts of the coupling shafts 14C, the housing 15 of the second air motor 10, and the other linear bushes 21 are fixed to the common coupling plate 14D. Therefore, each coupling shaft 14C is coupled to the ball screw 9A through the coupling plate 14D.

Accordingly, in the example shown in FIG. 1 and FIG. 2, the force in the tool axis AX direction generated by rotation of the ball screw 9A is transmitted to the housing 6 and the holder 4 of the tool rotating unit 2 through the coupling plate 14D and the two coupling shafts 14C. Therefore, it is also desirable to dispose the two coupling shafts 14C, which transmit the force generated by rotation of the ball screw 9A, so as to be symmetric with regard to the tool axis AX as the center in order to distribute the transmitted force equally, from a viewpoint of preventing generation of unnecessary torque, similarly to the shafts 19 for guiding the linear bushes 21.

On the other hand, in the example shown in FIG. 4, the feeding mechanism 3 has been attached to the tool rotating unit 2 by the couplers 14 including an annular coupler 14A and a coupling plate 14D. Specifically, the annular coupler 14A holds both the housing 6 of the tool rotating unit 2 and the housing 15 of the second air motor 10, and fixes the linear bushes 21 to them. Meanwhile, the coupling plate 14D fixes the linear bushes 21 to both back end parts of the housing 6 of the tool rotating unit 2 and the housing 15 of the second air motor 10. Accordingly, in the example shown in FIG. 4, the force in the tool axis AX direction generated by rotation of the ball screw 9A is transmitted to the housing 6 and the holder 4 of the tool rotating unit 2 through the coupling plate 14D mainly.

As described above, when the feeding mechanism 3, driven by the second air motor 10, is attached to the tool rotating unit 2, driven by the first air motor 5, with the couplers 14, it becomes possible to independently adjust the rotation speed (the number of rotations) of the rotating tool T, and the feeding speed of the rotating tool T in the tool axis AX direction by separately controlling the first air motor 5 for rotation of the rotating tool T and the second air motor 10 for the feeding operation of the rotating tool T in the tool axis AX direction.

That is, the rotation speed of the rotating tool T and the holder 4 can be variably set by adjusting the flow rate of an air signal supplied to the first air motor 5. Meanwhile, the feeding speed of the rotating tool T and the tool rotating unit 2 including the holder 4 in the tool axis AX direction can be variably set by adjusting the flow rate of an air signal supplied to the second air motor 10.

For that purpose, a pipe 22A to which compressed air is supplied branches a pipe 22B for supplying an air signal to the first air motor 5, and the first speed controller 23 is coupled to the pipe 22B so that the rotation speed of the rotating tool T and the holder 4 can be variably set by adjusting the flow rate of the first air signal input to the first air motor 5. In each of the examples shown in FIG. 1 and FIG. 4, the first speed controller 23 has been fixed to the lower part of the grip 7.

Meanwhile, the second speed controllers 24A and 24B are respectively coupled to pipes 22F and 22G for supplying air signals to the second air motor 10 so that the feeding speed of the rotating tool T and the holder 4 in the tool axis AX direction can be variably set by adjusting the flow rate of the second air signal input to the second air motor 10. The second speed controllers 24A and 24B can be attached to hoses composing the pipes 22F and 22G, a housing placing the pipes 22F and 22G, or the like.

As described above, the rotating tool T and the holder 4 are made to advance when the second air motor 10 is rotated normally while the rotating tool T and the holder 4 are made to retreat when the second air motor 10 is rotated in reverse. Therefore, the second air motor 10 couples the pipe 22F for supplying an air signal for normal rotation and the pipe 22G for supplying an air signal for inverse rotation. Accordingly, when the second speed controllers 24A and 24B are coupled to the pipe 22F, which supplies an air signal for normal rotation of the second air motor 10, and the pipe 22G, which supplies an air signal for reverse rotation of the second air motor 10, respectively as shown in FIG. 1, it becomes possible to separately adjust the feeding speed at the time of advancing the rotating tool T and the holder 4, and the feeding speed at the time of retreating the rotating tool T and the holder 4.

As a matter of course, the second speed controller 24B coupled to the pipe 22G for supplying an air signal for reverse rotation of the second air motor 10 may be omitted so that only the feeding speed at the time of advancing the rotating tool T and the holder 4 can be adjusted. Alternatively, the second single speed controller may be coupled to a pipe 22C in the upstream side in which the pipe 22G for supplying an air signal for reverse rotation of the second air motor 10 has not been branched from the pipe 22F for supplying an air signal for normal rotation of the second air motor 10. In this case, not only the feeding speed at the time of advancing the rotating tool T and the holder 4, but the feeding speed at the time of retreating the rotating tool T and the holder 4 can be adjusted using the common second speed controller.

The first speed controller 23 and the second speed controllers 24A and 24B may be provided to a user as components included in the tool driving device 1, or separately prepared by a user as equipment in a factory or the like.

Switching between the rotation operation and stop of the rotating tool T and the holder 4, i.e., switching between the rotation operation and stop of the first air motor 5 can be performed by manipulation of the mechanical switch 8 mounted near the grip 7 of the tool rotating unit 2 as described above. Meanwhile, switching between the start and stop of the feeding operation in the forward direction of the rotating tool T and the folder 4 for hole processing of the workpiece W by the rotating tool T, and switching between the start and stop of the feeding operation in the backward direction of the rotating tool T and the holder 4 for retracting the rotating tool T after hole processing can also be manually operated by a user, by attaching desired switches.

When the rotation operation and feeding operation of the rotating tool T and the holder 4 are interlocked with each other, manipulation of the tool driving device 1 by a user becomes simple and it becomes possible to perform hole processing of the workpiece W easily under appropriate processing conditions. Thus, henceforth, a case where an air signal circuit 25 for interlocking the rotation operation of the rotating tool T and the holder 4 with the feeding operation of the rotating tool T and the holder 4 is included in the tool driving device 1 will be explained as an example.

The air signal circuit 25 is a circuit for rotating both of the first air motor 5 and the second air motor 10 with interlocking with each other according to a switching state of the switch 8 of the tool rotating unit 2. The whole air signal circuit 25 may be a component of the tool driving device 1. Alternatively, equipment prepared in a factory or the like may be used as a part of the air signal circuit 25. Circuit elements, such as valves, necessary to compose the air signal circuit 25 can be attached to the housing 15 of the second air motor 10 or the like, in the form of an air signal circuit unit 25A. Thus, the tool driving device 1 can have various automatic, control functions according to the circuit configuration of the air signal circuit 25.

For example, the tool driving device 1 may be provided with the simple air signal circuit 25 by which both the first air motor 5 and the second air motor 10 rotate when the switch 8 of the tool rotating unit 2 is switched to the on state while both the first air motor 5 and the second air motor 10 stop when the switch 8 is switched to the off state.

As another concrete example, the tool driving device 1 may be provided with the complicated air signal circuit 25 by which, once the switch 8 of the tool rotating unit 2 is switched on, both the first air motor 5 and the second air motor 10 are normally rotated with predetermined rotation speeds respectively for a certain period, and subsequently normally rotated with altered rotation speeds respectively for another certain period, and subsequently the first air motor 5 which rotates the rotating tool T and the holder 4 stops rotating while the second air motor 10 which gives feeding operation to the rotating tool T and the holder 4 is rotated in reverse so that the rotating tool T and the holder 4 may be returned to the initial position. In other words, the tool driving device 1 may be provided with the air signal circuit 25 which automatically changes the rotation speed and the feeding speed of the rotating tool T during cutting of the workpiece W by the rotating tool T. The air signal circuit 25 having such functions can be composed of at least one pneumatic timer, such as a time delay valve.

Yet another example of the air signal circuit 25 having pneumatic timers is a circuit which intermittently and alternately repeats normal rotation and reverse rotation of the second air motor 10 during rotation of the first air motor 5 for step processing in which advancing and retreating of the rotating tool T and the holder 4 are intermittently and alternately repeated.

Alternatively, the tool driving device 1 may be provided with the air signal circuit 25 which stops rotation of the first air motor 5 and reversely rotates the second air motor 10 so that the rotating tool T and the holder 4 may return to an initial position when cutting resistance in the tool axis AX direction reaches an upper limit. Whether cutting resistance reached an upper limit can be determined by detecting whether the pressure of an air signal for normally rotating the second air motor 10 reached an upper limit or not, for example. Therefore, the air signal circuit 25 can be composed of circuit elements including a pneumatic operating control valve, having a piston, which opens and closes at predetermined pressures so that when cutting resistance reached an upper limit, the air signal circuit 25 can automatically stop rotation of the rotating tool T and the holder 4, and subsequently return the rotating tool T and the holder 4 to an initial position automatically. When pressures at which the pneumatic operating control valve opens and closes are made adjustable, the upper limit of cutting resistance can be also variably set.

Here, a circuit configuration of the air signal circuit 25 by which once the switch 8 of the tool rotating unit 2 is switched to the on state, rotating and advancing of the rotating tool T and the holder 4 are started, and when hole processing by the rotating tool T is completed, the rotation of the rotating tool T is automatically stopped, and subsequently the rotating tool T and the holder 4 are automatically returned to an initial position will be explained, as an example.

Figure 5:
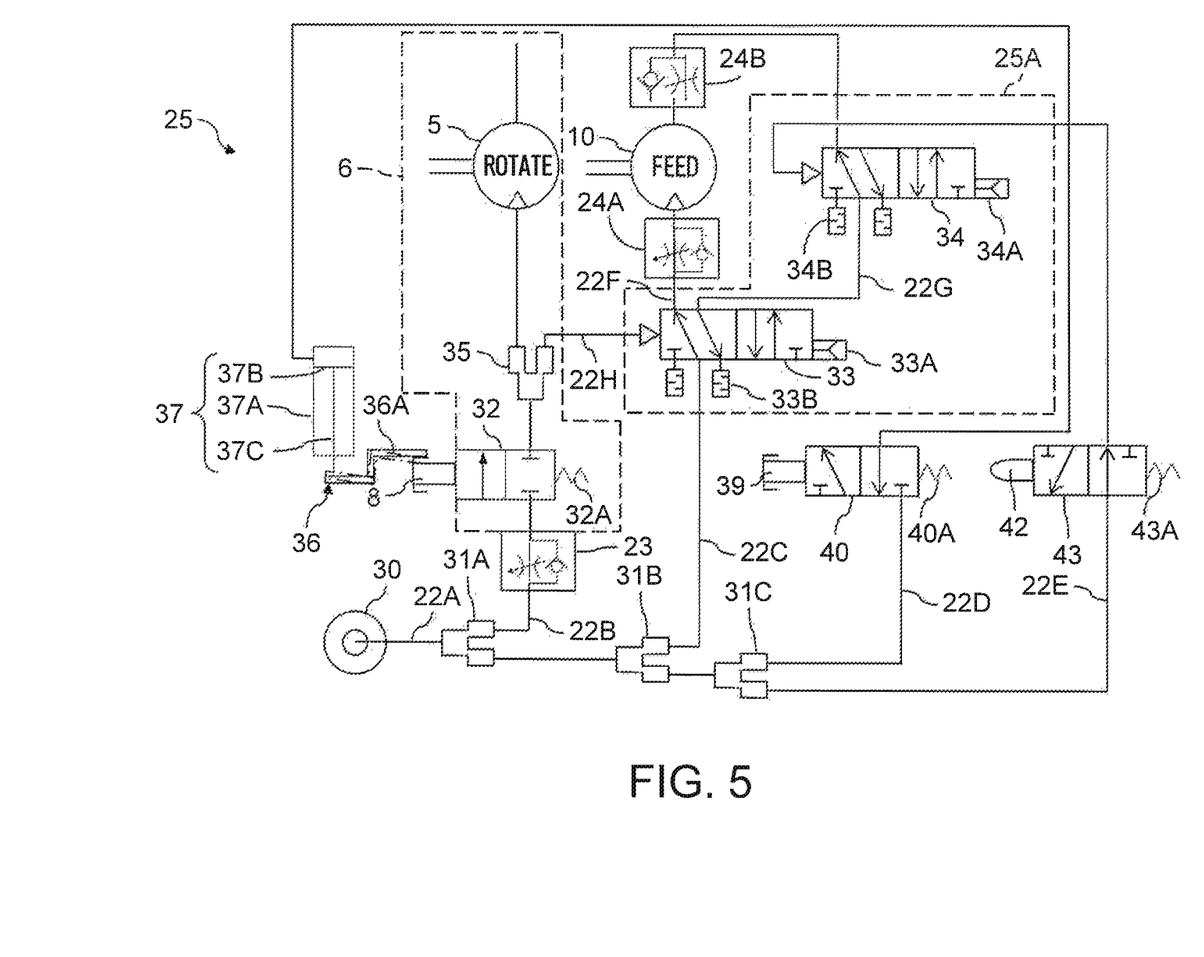
FIG. 5 is a circuit diagram showing an example of a circuit configuration of the air signal circuit, including the air signal circuit unit, for controlling the tool driving device, shown in FIG. 1 or FIG. 4, with air signals.

FIG. 5 is a circuit diagram showing an example of a circuit configuration of the air signal circuit 25, including the air signal circuit unit 25A, for controlling the tool driving device 1, shown in FIG. 1 or FIG. 4, with air signals.

The pipe 22A, to which an air coupler 30 is coupled to one end, branches four pipes 22B, 22C, 22D and 22E by the first branch element 31A, the second branch element 31B and the third branch element 31C. The air coupler 30 is an element coupled to a compressed air supply source, such as an air tank, filled with compressed air in order to receive supply of the compressed air.

The pipe 22B branching at the first branch element 31A is guided in the housing 6 of the tool rotating unit 2, and is used for supplying an input signal into the first air motor 5 disposed in the tool rotating unit 2. The first speed controller 23, for adjusting the flow rate of an air signal, and a normal closed manual operating control valve 32 opened and closed by operation of the switch 8 consisting of a push button are coupled to the pipe 22B for supplying an input signal into the first air motor 5. The manual operating control valve 32 is a valve switched using the elastic force of a spring 32A.

Accordingly, when the flow rate of an air signal is set by the first speed controller 23, and subsequently the switch 8 composed of the push button is pushed, the manual operating control valve 32 is opened, and thereby the air signal with the set flow rate can be input into the first air motor 5. That is, a desired rotation speed can be set, and the rotating tool T and the holder 4 can be rotated by the first air motor 5.

The output side of the pipe 22C branching off at the second branch element 31B is coupled to the first pneumatic operating control valve 33 which switches an output destination of an air signal between two pipes 22F and 22G. The first pneumatic operating control valve 33 is a valve switched by an air signal input into a pneumatic operating port, by utilizing a piston 33A driven by air pressure.

The output side of the pipe 22F coupled to one output port of the first pneumatic operating control valve 33 is coupled to an input port for normal rotation of the second air motor 10. Meanwhile, the output side of the pipe 22G coupled to the other output port of the first pneumatic operating control valve 33 is coupled to an input port for reverse rotation of the second air motor 10 through the second pneumatic operating control valve 34. The second pneumatic operating control valve 34 is a normal closed valve switched by an air signal input into a pneumatic operating port, by utilizing a piston 34A driven by air pressure.

The above-mentioned second speed controller 24A for advancing is coupled to the pipe 22F coupled to the input port for normal rotation of the second air motor 10. Similarly, the second speed controller 24B for retreating can be also coupled to the pipe 22G coupled to the input port for reverse rotation of the second air motor 10. As mentioned above, when the second speed controller 24B is coupled to the pipe 22G coupled to the input port for reverse rotation of the second air motor 10, a rotation speed of reverse rotation of the second air motor 10 can be adjusted. Therefore, the retreating speed of the rotating tool T and the holder 4 can be adjusted in addition to the advancing speed of the rotating tool T and the holder 4.

Meanwhile, the pipe 22B guided inside the housing 6 of the tool rotating unit 2 branches at an branch element 35 coupled between the manual operating control valve 32 and the first air motor 5, and the output side of a branched pipe 22H is coupled to an pneumatic operating port for switching the first pneumatic operating control valve 33. Therefore, an air signal flowing into the pipe 22H branching off inside the housing 6 of the tool rotating unit 2 is used as an operation signal for switching the output destination of the pipe 22C coupled to an input port of the first pneumatic operating control valve 33.

In the state where an air signal has not been input to the pneumatic operating port of the first pneumatic operating control valve 33, the pipe branching off at the second branch element 31B is coupled to the pipe 22G coupled to the input port for reverse rotation of the second air motor 10. On the contrary, when an air signal is input into the pneumatic operating port of the first pneumatic operating control valve 33, the output destination of the first pneumatic operating control valve 33 is switched, and thereby the pipe 22C branching off at the second branch element 31B is coupled to the pipe 22F coupled to the input port for normal rotation of the second air motor 10.

Therefore, when the switch 8 consisting of the push button is pushed to switch the manual operating control valve 32 to the on state, an air signal flows into the pipe 22H, branching off inside the tool rotating unit 2, and enters the pneumatic operating port of the first pneumatic operating control valve 33. Consequently, the output destination of the first pneumatic operating control valve 33 is switched, and thereby the pipe 22C branching off at the second branch element 31B is coupled to the pipe 22F for supplying an air signal for normal rotation of the second air motor 10. As a result, an air signal for normal rotation can be input into the second air motor 10 through the pipe 22C and the pipe 22F from the supply source of compressed air.

In such a manner, starting rotation of the first air motor 5 can be interlocked with starting rotation of the second air motor 10 so that when rotation of the rotating tool T and the holder 4 is started, feeding operation of the rotating tool T and the holder 4 can also be started. That is, when the single common switch 8 consisting of the push button is pushed to be switched on, normal rotation of both the first air motor 5 and the second air motor 10 can be started.

Moreover, the feeding speed of the rotating tool T and the holder 4 can be preset independently from the rotation speed of the rotating tool T and the holder 4 by handling the second speed controller 24A for advancing. Accordingly, the feeding amount in the tool axis AX direction per one rotation of the rotating tool T can be variably set. In other words, the cutting depth per one cutting edge of the rotating tool T which is important for cutting can be adjusted.

The rotation speed and the feeding speed of the rotating tool T and the holder 4 can be altered independently from each other also during hole processing. That is, the rotation speeds of the first air motor 5 and the second air motor 10 can be altered also during rotation of the first air motor 5 and the second air motor 10. This is because the respective rotation speeds of the first air motor 5 and the second air motor 10 can be altered independently by respectively handling the first speed controller 23 and the second speed controller 24A for advancing during normal rotation of the first air motor 5 and the second air motor 10.

Accordingly, when a processed product is produced by hole processing of the workpiece W, formed by laminating the first material M1 with the second material M2, using the tool driving device 1 as exemplified in FIG. 1 or FIG. 4, the hole processing can be performed under hole processing conditions in which the feeding amount in the tool axis AX direction per one rotation of the rotating tool 1 during hole processing of the first material M1 is different from the feeding amount in the tool axis AX direction per one rotation of the rotating tool T during hole processing of the second material M2.

That is, hole processing of the workpiece W can be performed under appropriate hole processing conditions according to not only a metal, such as an aluminum alloy or a titanium alloy, but also a material including an FRP (Fiber Reinforced Plastic), such as GFRP (Glass Fiber Reinforced Plastic) or CFRP (Carbon Fiber Reinforced Plastic). In addition, even in a case where the workpiece W is made of a laminated material consisting of two or more different materials as well as a case where the workpiece W is made of a single material, it becomes possible to perform hole processing while changing the feeding amount in the tool axis AX direction per one rotation of the rotating tool T according to each material.

The switch 8 of the tool rotating unit 2 is composed of the push button which applies force on the manual operating control valve 32 as exemplified in FIG. 1 and FIG. 5, similarly to a typical tool rotating device. In case of a conventional typical tool rotating device, a user needs to continue pushing a push button with a finger in order to maintain rotation of a tool. In other words, when a user releases a finger from the push button of the conventional typical tool rotating device, rotation of the tool stops since a manual operating control valve is closed by the elastic force of a spring.

Continuing pushing the switch 8 with a finger throughout hole processing of the workpiece W leads to increase in labor of a user. In addition, if the switch 8 is turned off during hole processing of the workpiece W, trouble that the rotating tool T moves forward at an insufficient rotation speed may arise. Accordingly, the air signal circuit 25 can be configured to lock the switch 8 in the on state during normal rotation of the second air motor 10 for advancing the rotating tool T and the holder 4 in the tool axis AX direction.

In that case, a stopper mechanism 36 which physically stops movement of the switch 8 can be attached to the tool rotating unit 2 while a circuit for driving the stopper mechanism 36 by an air signal can be included in the air signal circuit 25, for example. In each of the examples shown in FIG. 1 and FIG. 4, the tool rotating unit 2 is provided with the stopper mechanism 36 including a switch holding plate 36A which, when the push button composing the switch 8 is pushed, presses against the head of the push button at a position of the pushed head.

The switch holding plate 36A is attached rotatably around a rotating shaft 36B and configured to press the head of the switch 8 by elastic force of a torsion coil spring 36C. Therefore, once a user pushes the switch 8 with a finger, the head of the switch 8 is pressed by the switch holding plate 36A, and thereby movement of the switch 8 is stopped. That is, the switch 8 can be locked in the state where the switch 8 has been pressed so that the manual operating control valve 32 may not be closed with the elastic force of the spring 32A. Thereby, it becomes possible to automatically maintain rotation and feeding of the rotating tool T and the holder 4, by which a user can concentrate on adjusting the rotating speed and the feeding speed of the rotating tool T.

When hole processing of the workpiece W has been completed, turning the locked switch 8 off so that the rotation of the rotating tool T and the holder 4 may be stopped promptly leads to reduction in energy loss of compressed air. Accordingly, the air signal circuit 25 can be provided with a circuit which detects the completion of hole processing of the workpiece W and removes the switch holding plate 36A from the head of the switch 8 when the completion of hole processing of the workpiece W has been detected.

As a concrete example, an air cylinder 37 which presses up the switch holding plate 36A to remove the switch holding plate 36A from the head of the switch 8 can be attached as shown in FIG. 1, FIG. 4 and FIG. 5. More specifically, the air cylinder 37 composed of a cylinder tube 37A, a piston 37B and a rod 37C can be attached to a desired portion, such as the tool rotating unit 2 or the coupler 14, which advances together with the switch 8 in the tool axis AX direction. In this case, when an air signal is input into the cylinder tube 37A inside which the piston 37B has been inserted, the end part of the switch holding plate 36A can be pressed by the projected rod 37C coupled to the piston 37B. For example, the stopper mechanism 36 and the air cylinder 37 can be attached to the annular coupler 14A for coupling the feeding mechanism 3 to the housing 6 of the tool rotating unit 2 as each of the examples shown in FIG. 1 and FIG. 4.

In this case, when an air signal is input into the air cylinder 37, the rod 37C is extended and thereby presses the end part of the switch holding plate 36A as mentioned above. Thereby, the switch holding plate 36A rotates around the rotating shaft 36B against the elastic force of the torsion coil spring 36C. That is, the lock of the switch 8 can be released by the air signal.

On the other hand, the completion of hole processing of the workpiece W can be detected by detecting that the rotating tool T and the holder 4 have reached a stop position. In that case, a stroke switch pressing member 38 can be coupled to the tool rotating unit 2 side while a stroke switch 39 of a push button type can be attached to a portion, such as the nosepiece 13, the member 18 having the female screw 17 or the shaft 21, which does not move in the tool axis AX direction, so that when the rotating tool T and the holder 4 have reached a position where they should stop, the stroke switch 39 contacts with and thereby is pushed by the stroke switch pressing member 38.

Conversely, the stroke switch 39 may be attached to a portion, such as the housing 15 where the second air motor 10 and the gears 11 are placed, which moves in the tool axis AX direction while the stroke switch pressing member 38 may be attached to a portion which does not move in the tool axis AX direction.

In each of the examples shown in FIG. 1, FIG. 2, and FIG. 4, the stroke switch 39 has been attached to one of the shafts 21 through a bracket 39A. Meanwhile, the coupling plate 14D, for attaching the linear bushes 21 and the like to the housing 15 where the second air motor 10 and the gears 11 are placed, also serves as the stroke switch pressing member 38 which contacts with the stroke switch 39.

The stroke switch 39 can be coupled to the normal closed first mechanical operating control valve 40 which is opened and closed by a spring 40A, as a mechanical switch for switching the first mechanical operation control valve 40, as shown in FIG. 5. The first mechanical operating control valve 40 is coupled on the pipe 22D branching off at the third branch element 31C. The pipe 22D opened and closed by the first mechanical operation control valve 40 is coupled to the air cylinder 37 for releasing the lock of the switch 8 by the switch holding plate 36A.

Before the rotating tool T and the holder 4 reach a stop position by normal rotation of the second air motor 10, the first mechanical operating control valve 40 is in the closed state since the stroke switch 39 is not pushed. Accordingly, an air signal, which flows from the supply source of compressed air into the pipe 22D through the third branch element 31C, is not supplied into the air cylinder 37. Therefore, the lock of the switch 8 by the switch holding plate 36A is kept.

Meanwhile, when the rotating tool T and the holder 4 have advanced to a stop position by normal rotation of the second air motor 10, the stroke switch pressing member 38 coupled to the tool rotating unit 2 side contacts with the stroke switch 39, and thereby the stroke switch 39 is pushed. Thereby the first mechanical operating control valve 40 is switched from the off-state to the on-state. That is, the first mechanical operating control valve 40 opens and an air signal is input from the pipe 22D into the air cylinder 37.

As a result, the rod 37C coupled to the piston 37B projects from the cylinder tube 37A, and presses the end portion of the switch holding plate 36A. Accordingly, the switch holding plate 36A rotates around the rotating shaft 36B against the elastic force of the torsion coil spring 36C, and thereby the switch holding plate 36A disengages the head of the switch 8. Thereby, the switch 8 returns to the off-state by the elastic force of the spring 32A of the manual operating control valve 32. Consequently, the air signal supplied from the pipe 22B into the first air motor 5 is cut off, and thereby the rotation of the first air motor 5 is stopped.

As described above, releasing the lock of the switch 8, turning the switch 8 off, and stopping the rotation of the first air motor 5 can be each automatically performed by operation of the switch holding plate 36A, for locking the switch 8 in the on-state, and the air cylinder 37 driven by pushing the stroke switch 39.

Note that, when the distance between the stroke switch 39 and the stroke switch pressing member 38 can be made adjustable, it becomes possible to variably set a stop position of the rotating tool T and the holder 4, i.e., the stroke (moving range) itself. In this case, the distance by which the rotating tool T and the holder 4 are advanced can be adjusted according to the depth of hole processing of the workpiece W. Accordingly, the stroke switch 39 may be fixed to a desired position of the shaft 21 by the bracket 39A, for example. Specifically, when the bracket 39A for attaching the stroke switch 39 is detachably attached to the shaft 21 by a setscrew or the like, the position of the stroke switch 39 can be altered.

The same applies to not only the case of using the stroke switch 39 and the stroke switch pressing member 38 as air circuit elements for detecting that the holder 4 has advanced to a stop position, but a case of using other air circuit elements. That is, a stop position of the holder 4 can be made adjustable according to air circuit elements After the rotating tool T and the holder 4 has reached a stop position and the rotation of the rotating tool T and the holder 4 has been stopped, it is necessary to retreat the rotating tool T and the holder 4 to be returned to the initial position. In addition, when the rotating tool T and the holder 4 have been returned to the initial position, it is necessary to stop backward feeding operation of the rotating tool T and the holder 4.

Accordingly, a plunger pressing member 41 can be coupled to the tool rotating unit 2 side while a plunger 42 can be attached to a portion, such as the member 18 having the female screw 17, which does not move in the tool axis AX direction so that the plunger 42 may be pushed by contact with the plunger pressing member 41 when the rotating tool T and the holder 4 have reached the initial position, as exemplified in FIG. 1, FIG. 2 and FIG. 4, in order to detect whether the rotating tool T and the holder 4 have moved backward to the initial position. As a matter of course, conversely, the plunger pressing member 41 may be attached to a portion, such as the member 18 having the female screw 17, which does not move in the tool axis AX direction while the plunger 42 may be attached to a portion which moves in the tool axis AX direction.

The plunger 42 can be coupled to the normal opened second mechanical operating control valve 43 opened and closed by a spring 43A, as a mechanical switch for switching the second mechanical operating control valve 43, as shown in FIG. 5.

That is, the air signal circuit 25 can be provided with the second mechanical operating control valve 43 which is in the closed state while the rotating tool T and the holder 4 have reached the initial position and thereby the plunger 42 has been pushed by contact with the plunger pressing member 41, and in the opened state while the rotating tool T and the holder 4 are away from the initial position and thereby the plunger 42 has not been pushed.

The second mechanical operating control valve 43 is disposed on the other pipe 22E branching off at the third branch element 31C. The output side of the pipe 22E coupled to an output port of the second mechanical operating control valve 43 is coupled to a pneumatic operating port of the second pneumatic operating control valve 34. Therefore, when the rotating tool T and the holder 4 lie at the initial position, the second mechanical operating control valve 43 is closed by the pushed plunger 42, and thereby an air signal is not input into the pneumatic operating port of the second pneumatic operating control valve 34. As a result, the second pneumatic operating control valve 34 is also in the closed state. That is, the pipe 22G coupled to the input port for reverse rotation of the second air motor 10 is cut off On the contrary, when the rotating tool T and the holder 4 are not at the initial position, the plunger 42 is not pushed, and thereby the second mechanical operating control valve 43 is opened. Consequently, an air signal flowing in the pipe 22E is input into the pneumatic operating port of the second pneumatic operating control valve 34. Therefore, the second pneumatic operating control valve 34 is opened, and thereby the pipe 22G coupled to the input port for reverse rotation of the second air motor 10 is opened.

That is, a circuit which opens the pipe 22G for supplying an air signal for reverse rotation of the second air motor 10 only when the rotating tool T and the holder 4 are not at the initial position can be formed using the second pneumatic operating control valve 34 and the second mechanical operating control valve 43 switched by the plunger 42 serving as a mechanical switch.

As described above, when the rotating tool T and the holder 4 have advanced to a stop position, the stroke switch 39 is pushed, and thereby the switch 8 is turned off. When the switch 8 returns to the off-state, not only an air signal supplied into the first air motor 5 but an air signal input into the pneumatic operating port of the first pneumatic operating control valve 33 is cut off. Accordingly, the first pneumatic operating control valve 33 is switched to the initial state, and the pipe 22C coupled to the input port of the first pneumatic operating control valve 33 is coupled to the pipe 22G coupled to the input port for reverse rotation of the second air motor 10.

Moreover, after the rotating tool T and the holder 4 advanced, the plunger 42 is not pushed. Accordingly, the second pneumatic operating control valve 34 disposed on the pipe 22G coupled to the input port for reverse rotation of the second air motor 10 becomes the opened state. Therefore, an air signal supplied from the pipe 22C, coupled to the supply source of compressed air, into the pipe 22G through the first pneumatic operating control valve 33 passes through the second pneumatic operating control valve 34, and is input into the input port for reverse rotation of the second air motor 10. As a result, the second air motor 10 rotates in reverse, and the rotating tool T and the holder 4 move backward. That is, the rotational direction of the second air motor 10 is reversed, and backward feeding operation of the rotating tool T and the holder 4 is started automatically.

When the rotating tool T and the holder 4 have moved backward and reached the initial position by reverse rotation of the second air motor 10, the plunger pressing member 41 pushes the plunger 42. Accordingly, the second mechanical operating control valve 43 is switched in the closed state and thereby the input of an air signal for opening the second pneumatic operating control valve 34 is cut off. Therefore, the second pneumatic operating control valve 34 is also switched in the closed state. As a result, the supply of an air signal into the input port for reverse rotation of the second air motor 10 is cut off, and the reverse rotation of the second air motor 10 is stopped. That is, the backward movement of the rotating tool T and the holder 4 is stopped.

As described above, combination of circuit elements including the second mechanical operating control valve 43 having the plunger 42, the first pneumatic operating control valve 33 and the second pneumatic operating control valve 34, in addition to the switch holding plate 36A for locking the switch 8 in the on-state and the air cylinder 37 driven by pushing the stroke switch 39 can give, to the air signal circuit 25, a function to automatically retreat the rotating tool T and the holder 4 in the tool axis AX direction by automatically rotating the second air motor 10 in reverse when the rotating tool T and the holder 4 has advanced up to a stop position, and a function to automatically stop the rotation of the second air motor 10 when the holder 4 has moved backward down to the initial position by reverse rotation of the second air motor 10.

In addition to the above-mentioned circuit elements, mufflers 33B and 34B can be coupled to the first pneumatic operating control valve 33, coupled to the input port for normal rotation of the second air motor 10 through the pipe 22F, and the second pneumatic operating control valve 34, coupled to the input port for reverse rotation of the second air motor 10 through the pipe 22G, as silencers, respectively.

As described above, the tool driving device 1, the tool feeding mechanism for the tool rotating unit 2 and the hole processing method use the second air motor 10 as the power source for advancing and retreating the rotating tool T and the holder 4 in the tool axis AX direction, separately to the first air motor 5 as the power source for rotating the rotating tool T and the holder 4.

Effects

The tool driving device 1, the tool feeding mechanism for the tool rotating unit 2 and the hole processing method can separately control the rotation speed and the feeding speed of the rotating tool T and the holder 4. Accordingly, hole processing of the workpiece W can be performed at the feeding amount per one cutting edge and the feeding amount per one rotation which are appropriate for the characteristics of the rotating tool T and materials of the workpiece W. As a result, the quality of hole processing can be improved. Moreover, increase in time for hole processing on the ground that the feeding speed of the rotating tool T cannot be increased even though the feeding speed should be increased can be avoided.

In case of a conventional tool driving device having a feeding function, rotation and feeding operation of a rotating tool are activated by a common air motor. Accordingly, there is a characteristic that the feeding speed of a rotating tool increases as the rotation speed increases while the feeding speed of the rotating tool decreases as the rotation speed decreases since the feeding speed of the rotating tool is interlocked with the rotation speed of the rotating tool. Therefore, in case of a conventional tool driving device, the feeding amount per one rotation of a rotating tool cannot be adjusted, which requires to procure a plurality of tool driving devices tuned for respective hole processing conditions including sizes of rotating tools and materials of workpiece.

Although a tool driving device which can alter the feeding speed of a rotating tool by exchanging cartridges has been also commercially available, exchanging the cartridges requires labor and time.

On the other hand, when the tool driving device 1 is used, the rotation speed and the feeding speed of the rotating tool T and the holder 4 can be continuously and independently changed easily only by handling the first speed controller 23 and the second speed controller 24A for advance. Accordingly, hole processing by different rotating tools T and hole processing of different materials can be performed by the single tool driving device 1. As a result, not only reduction in tool costs and the number of tool driving devices, but reduction in time required for preparation of hole processing can be attained since exchanging tool driving devices becomes unnecessary.

In addition, when the tool driving device 1 is used, the feeding amount per one cutting edge and the feeding amount per one rotation of a rotating tool can be changed also during hole processing. Accordingly, when hole processing of the workpiece W made of laminated materials M1 and M2 different from each other is performed as exemplified in FIG. 1 and FIG. 4, it becomes possible to perform the hole processing continuously under processing conditions, different from each other, corresponding to the materials M1 and M2 respectively.

As a concrete example, when hole processing of a workpiece made by laminating an aluminum alloy and a titanium alloy is performed using a conventional tool driving device or conventional tool driving devices, three methods can be considered. The first method is to process a layer consisting of the aluminum alloy by a tool driving device tuned for hole processing of the aluminum alloy and to process a layer consisting of the titanium alloy by another tool driving device tuned for hole processing of the titanium alloy. The second method is to process both the layer consisting of the aluminum alloy and the layer consisting of the titanium alloy only by the tool driving device tuned for hole processing of the aluminum alloy. The third method is to process both the layer consisting of the aluminum alloy and the layer consisting of the titanium alloy only by the tool driving device tuned for hole processing of the titanium alloy.

When the first method is adopted, two kinds of the tool driving devices are required and it is necessary to exchange the tool driving devices in the middle of the hole processing. For this reason, it leads to an increase in hole processing cost. Moreover, the titanium alloy is known as a hard-to-cut material having strength higher than that of the aluminum alloy. Accordingly, when the second method of hole processing under hole processing conditions for the aluminum alloy is adopted, the feeding amount per one cutting edge of a rotating tool becomes excess during hole processing of the titanium alloy, which may cause a burn of the titanium alloy or breakage of the rotating tool. As a result, it leads to degradation in quality of hole processing and wear of the tool. Conversely, when the third method of hole processing under hole processing conditions for the titanium alloy is adopted, the feeding amount per one cutting edge of a rotating tool does not increase during hole processing of the layer of the aluminum alloy even though the feeding amount per one cutting edge of the rotating tool can be increased. For this reason, it leads to an increase in hole processing time.

On the contrary, when the tool driving device 1 is used, hole processing of the layer of the aluminum alloy and hole processing of the layer of the titanium alloy can be performed under different cutting conditions respectively. Specifically, the layer of the titanium alloy, which is a hard-to-cut material, can be processed at the sufficiently decreased feeding amount per one cutting edge of the rotating tool T so as to secure the quality of hole processing while the layer of the aluminum alloy, which is easy to be machined, can be processed with increasing the feeding amount per one cutting edge of the rotating tool T in order to shorten processing time.

Moreover, although it can also be considered that feeding operation may be given to the rotating tool T by an air cylinder instead of an air motor, there is a limit since thrust obtained by an air cylinder is generated by pushing out a piston with air pressure. Accordingly, when the strength of a workpiece is large, thrust which can oppose reaction force by hole processing may not be obtained by an air cylinder.

On the contrary, when force is mechanically transmitted to the rotating tool T by the linear movement mechanism 9, such as the ball screw 9A, which moves linearly by rotation of the second air motor 10, like the tool driving device 1, large thrust, which is difficult to be obtained by an air cylinder, can be obtained. Accordingly, the rotating tool T can be fed by thrust which can oppose hole processing reaction force while feeding speed can be adjusted. In particular, when the gears 11 are coupled to the second air motor 10, it becomes possible to generate thrust which can oppose hole processing reaction force even in a case where the strength of a workpiece is large.

Other Implementations

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, although an example of a case where the tool driving device 1 is a hand tool has been described in the above-mentioned implementation, the tool driving device 1 can be composed by adding the second air motor 10 as the power source which advances and retreats the rotating tool T and the holder 4 in the tool axis AX direction, apart from the first air motor 5 as the power source which rotates the rotating tool T and the holder 4, also in case of a machine tool, or a pneumatic drilling machine which is not handheld and has a feeding function of the rotating tool T in the tool axis AX direction.

What is claimed is:

1. A tool feeding mechanism for a handheld tool rotating device having a holder and a first air motor, the holder chucking and holding a rotating tool, the first air motor rotating the holder, the tool feeding mechanism being attached to the tool rotating device,
the tool feeding mechanism comprising:
a coupler attached to the tool rotating device;
a fixing member, having a bush, attached directly or indirectly to a workpiece of hole processing using the rotating tool;
a moving mechanism, having at least one of a crawler, a rack-and-pinion and a ball screw, that moves the coupler relatively to the fixing member in a tool axis direction; and
a second air motor that powers the moving mechanism.

2. The tool driving device according to claim 1, wherein each of the first and second air motors move in the tool axis direction, together with the holder.

3. A tool driving device comprising:
a holder for chucking and holding a rotating tool;
a first air motor for rotating the holder; and
a feeding mechanism, having a second air motor, that moves the holder and the first motor in a tool axis direction, the second air motor generating power for moving the holder, and wherein the tool driving device is handheld and includes:
a housing of the first air motor;
a grip which a user grips by a hand, the grip being coupled to the housing.

4. The tool driving device according to claim 3, further comprising:
a first speed controller for variably setting a rotation speed of the holder by adjusting a flow rate of a first air signal input into the first air motor; and
a second speed controller for variably setting a feeding speed of the holder in the tool axis direction by adjusting a flow rate of a second air signal input into the second air motor.

5. The tool driving device according to claim 3, wherein the feeding mechanism further includes a gear that increases torque output from the second air motor.

6. The tool driving device according to claim 3,
wherein the tool driving device includes:
a switch operated by the user; and
an air signal circuit that rotates the first air motor and the second air motor according to a switching state of the switch.

7. The tool driving device according to claim 6, wherein the feeding mechanism is adapted to move a tool rotating unit in the tool axis direction, the tool rotating unit having at least the holder, the first air motor, the housing, the grip and the switch.

8. The tool driving device according to claim 6, wherein the air signal circuit is adapted to start normal rotations of the first air motor and the second air motor when the single and common switch has been turned on.

9. The tool driving device according to claim 6, wherein the air signal circuit is adapted to lock the switch in an on state while the holder is moving forwardly in the tool axis direction by a normal rotation of the second air motor, and automatically unlock and turn off the switch when the holder has moved forwardly to a stop position.

10. The tool driving device according to claim 6, wherein the air signal circuit is adapted to automatically stop a rotation of the first air motor when the holder has moved forwardly to a stop position by a normal rotation of the second air motor.

11. The tool driving device according to claim 6, wherein the air signal circuit is adapted to automatically and reversely rotate the second air motor when the holder has moved forwardly to a stop position by a normal rotation of the second air motor, the holder moving backwardly in the tool axis direction by a reverse rotation of the second air motor.

12. The tool driving device according to claim 6, wherein the air signal circuit is adapted to automatically stop a rotation of the second air motor when the holder has moved backwardly to an initial position by a reverse rotation of the second air motor.

13. The tool driving device according to claim 9, wherein the air signal circuit has an air circuit element detecting that the holder has moved forwardly to the stop position, the air circuit element allowing an adjustment of the stop position.

14. The tool driving device according to claim 3, wherein the feeding mechanism includes:
   a fixing member for fixing the tool driving device to a workpiece of hole processing by the rotating tool, or a jig for the hole processing, the jig being attached to the workpiece, the fixing member having a bush; and
   a ball screw moving the holder in the tool axis direction, the holder being moved relatively to the fixing member,
   wherein the second air motor gives rotation power to the ball screw.

15. The tool driving device according to claim 14,
   wherein a rotation axis of the ball screw and a tool axis of the rotating tool are disposed on a same straight line,
   one end of the ball screw in a tip side of the rotating tool is directly or indirectly coupled to the second air motor, and
   the second air motor moves in the tool axis direction, together with the holder.

16. The tool driving device according to claim 14,
   wherein a rotation axis of the ball screw and a tool axis of the rotating tool are disposed in parallel,
   one end of the ball screw in a tip side of the rotating tool is directly or indirectly coupled to the second air motor, and
   the second air motor moves in the tool axis direction, together with the holder.

17. A hole processing method comprising:
   producing a product using the tool driving device according to claim 3.

18. A hole processing method according to claim 17, wherein the product is produced by first hole processing and second hole processing of a workpiece consisting of laminated first and second materials, the first hole processing of the first material and the second hole processing of the second material being performed under a hole processing condition that a first feeding amount of the rotating tool, per one rotation of the rotating tool, in the tool axis direction, in the first hole processing is different from a second feeding amount of the rotating tool, per one rotation of the rotating tool, in the tool axis direction, in the second hole processing.

19. The tool driving device according to claim 4, wherein the feeding mechanism further includes a gear that increases torque output from the second air motor.

20. The tool driving device according to claim 4, wherein the tool driving device includes:
   a switch operated by the user; and
   an air signal circuit that rotates the first air motor and the second air motor according to a switching state of the switch.

21. The tool driving device according to claim 4, wherein the feeding mechanism includes:
   a fixing member for fixing the tool driving device to a workpiece of hole processing, using the rotating tool, or a jig for the hole processing, the jig being attached to the workpiece; and
   a ball screw moving the holder in the tool axis direction, the holder being moved relatively to the fixing member,
   wherein the second air motor gives rotation power to the ball screw.

22. The tool driving device according to claim 3, wherein each of the first and second air motors move in the tool axis direction, together with the holder.

* * * * *